United States Patent [19]

Goloff

[11] Patent Number: 5,710,535
[45] Date of Patent: Jan. 20, 1998

[54] COIL ASSEMBLY FOR A SOLENOID VALVE

[75] Inventor: C. Nickolas Goloff, Secor, Ill.

[73] Assignee: Caterpillar Inc., Peoria, Ill.

[21] Appl. No.: 759,658

[22] Filed: Dec. 6, 1996

[51] Int. Cl.⁶ .................... H01F 27/29; H01F 27/30; H02G 3/18; H01B 19/26
[52] U.S. Cl. .................... 336/192; 336/192; 336/205; 336/96; 336/198; 174/151; 174/65 G; 174/65 R; 174/65.55
[58] Field of Search .................... 174/151, 65 CT, 174/65 SS, 65 R, 152 G; 336/205, 96, 192

[56] References Cited

U.S. PATENT DOCUMENTS

| | | | |
|---|---|---|---|
| 3,430,174 | 2/1969 | Kogo et al. | 336/83 |
| 3,953,099 | 4/1976 | Wilson | 339/60 |
| 4,256,920 | 3/1981 | Ayers et al. | 174/65 R |
| 4,284,312 | 8/1981 | Patchett et al. | 339/60 |
| 5,153,550 | 10/1992 | Sugiura et al. | 336/192 |
| 5,173,053 | 12/1992 | Swanson et al. | 439/27 |

Primary Examiner—Cassandra C. Spyrou
Assistant Examiner—Anh Mai
Attorney, Agent, or Firm—J. W. Burrows

[57] ABSTRACT

A coil assembly for a solenoid valve includes a sealing member having a sealed cavity that generally encircles an opening containing an electrical lead extending from the windings of the coil. The sealing member is disposed within a encapsulating material that is pressure molded around the windings of the coil assembly. During the pressure molding process, the pressure from the molding process exerts a force on the outermost side of the sealing member and compresses the outer member. The force being exerted to the outermost diameter is transferred through the sealed cavity to the innermost portion of the sealing member forcing it into a forced intimate contact with the lead. The force on the lead is maintained after the pressure from the molding process is removed. This arrangement provides a seal between the lead and the sealing member that is effective to prohibit damaging elements reaching the windings contained in the coil assembly.

11 Claims, 3 Drawing Sheets

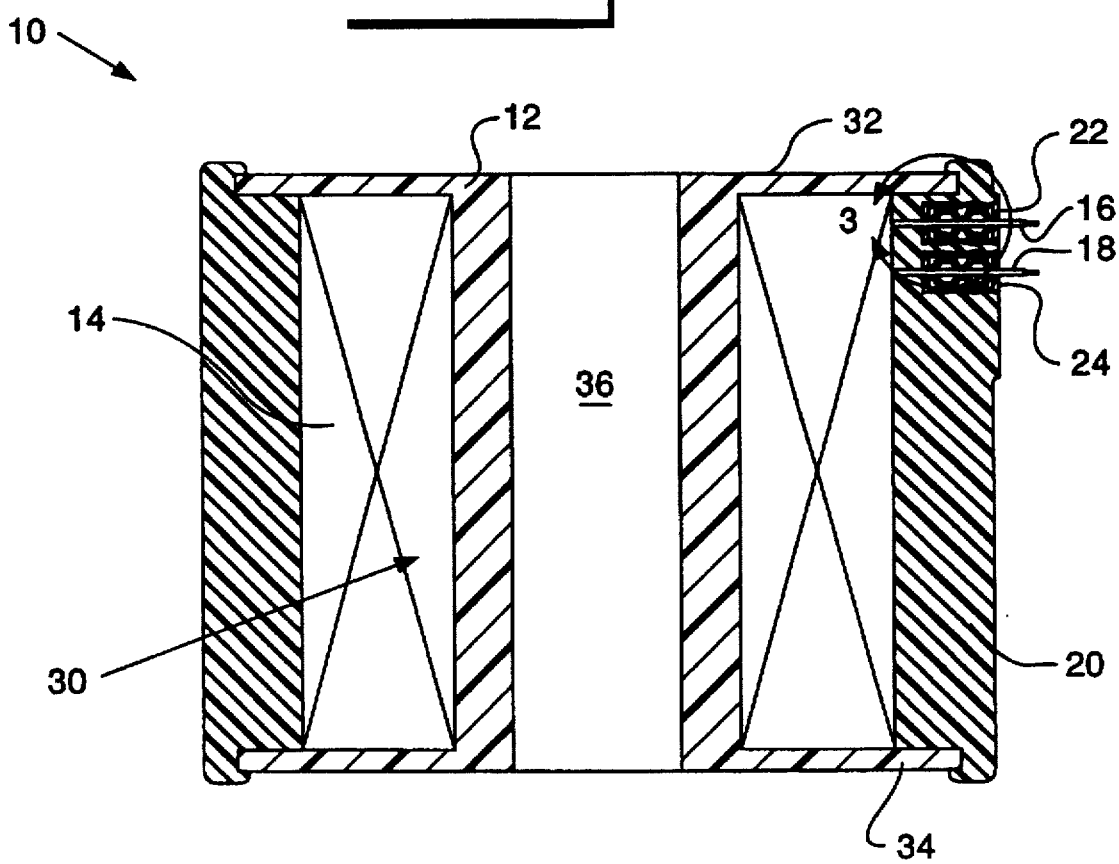
Fig_2_
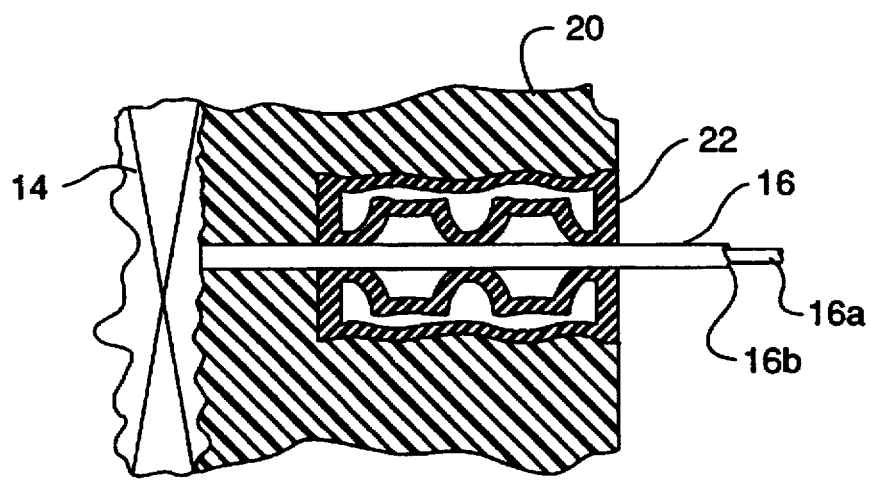
Fig_3_

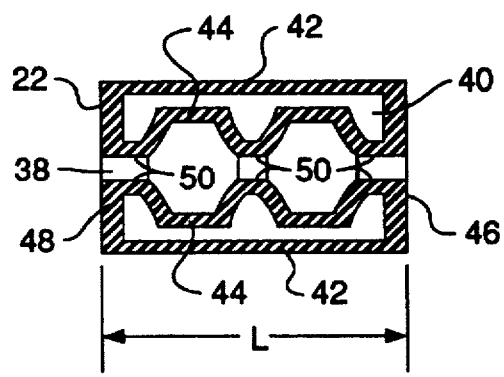
Fig_4_
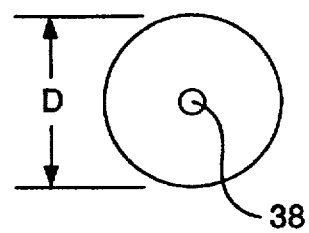
Fig_5_
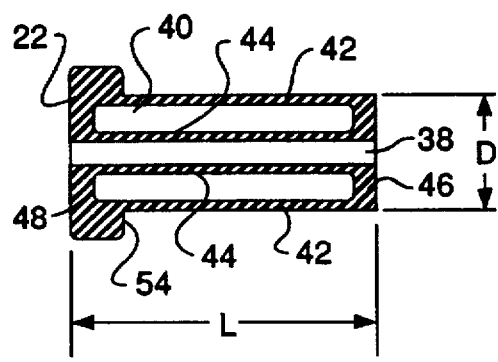
Fig_6_
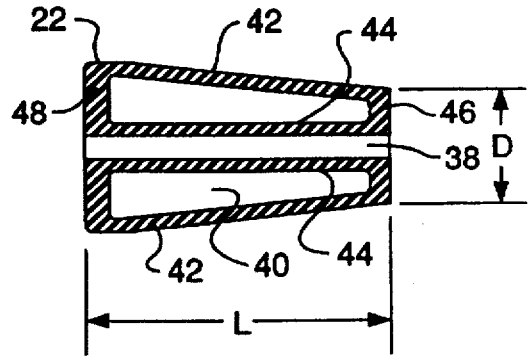
Fig_7_
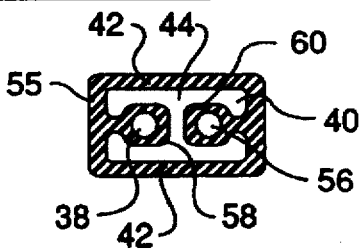
Fig_8_

5,710,535

COIL ASSEMBLY FOR A SOLENOID VALVE

TECHNICAL FIELD

This invention relates generally to a coil assembly for a solenoid valve and more particularly to a sealing arrangement between the leads extending from the windings assembly and the encapsulating cover material of the coil.

BACKGROUND ART

Coil assemblies for solenoid valves or the like are well known and include a bobbin member having an opening defined therein with windings encircling the bobbin with insulated electrical leads extending outwardly from the windings. A encapsulating or encapsulating material covers the windings and encircles the leads extending from the windings. In many coil assemblies, the encapsulating material is applied over the windings and the bobbin by an injection molding process or by a transfer molding process. Since these coil assemblies must withstand various levels of operating temperatures, the encapsulating material must be of a type that can withstand the various levels of operating temperatures. In order to provide an acceptable length of service life, it is necessary to prohibit entry of harmful elements from the surrounding atmosphere into the windings. Harmful elements, such as salts, water, or other corrosive materials, exposed to the windings shorten the life of the coil assembly. These harmful elements may enter by various paths, one of which is between the encapsulating material and the leads. Another path is between the electrical lead and the surrounding insulating material. Many times air trapped in the coil assembly during the molding process expands during normal use due to normal operating temperatures and forces its way out through the juncture of the encapsulated material and the leads. Once the coil assembly is deactivated and the coil assembly cools, the lowering of the temperature within the void serves to suck or wick the air back into the void. The air returning from the surrounding environment may times carries harmful elements with it. Various attempts have been made in the past to provide materials on the lead that bonds with the encapsulating material. However, due to the differing expansion and contraction rates of the different materials, a positive seal is not always obtained during construction or maintained during use. It has been known to apply various sealing materials, such as epoxy or silicon, to the leads at the point at which the leads exit the encapsulating material. Even though this method proves to be reasonably satisfactory, the manual application is time consuming and consequently cost prohibitive. It has also been known to place an O-ring or other solid elastomeric material around the leads at the point of exit of the leads prior to the injection molding process. Even though the encapsulating material is injected under pressure, the O-ring does not press against the leads. This is attributed to the fact that the elastomeric material of the O-ring is basically incompressible. The material of the O-ring does not flow into other areas around the leads, since the pressure from the injection molding process is acting on substantially the entire outer surface of the O-ring.

The present invention is directed to overcoming one or more of the problems as set forth above.

DISCLOSURE OF THE INVENTION

In one aspect of the subject invention a coil assembly is provided and includes a bobbin having a cylindrical portion with flanges disposed at opposite ends thereof and an opening defined therethrough. An electrical conducting winding is disposed around the cylindrical portion of the bobbin and has an electrical lead extending outwardly therefrom. A sealing member is disposed around the electrical lead and has a sealed cavity defined therein. A encapsulating material is pressure molded around the windings and encircles the electrical lead extending therefrom.

BRIEF DESCRIPTION OF THE DRAWINGS

FIG. 2 is a cross-sectional view taken along the line 2—2 of FIG. 1;

FIG. 3 is an enlarged partial section taken along the line 3—3 of FIG. 2;

FIG. 4 is a cross-sectional view of a sealing member of the subject invention;

FIG. 5 is an end view of the sealing member of FIG. 4;

FIG. 6 is a cross-sectional view of an alternate embodiment of the sealing member;

FIG. 7 is a cross-sectional view of another alternate embodiment of the sealing member; and FIG. 8 is a cross-sectional view of yet another alternate embodiment of the sealing member.

BEST MODE FOR CARRYING OUT THE INVENTION

Figure 1:
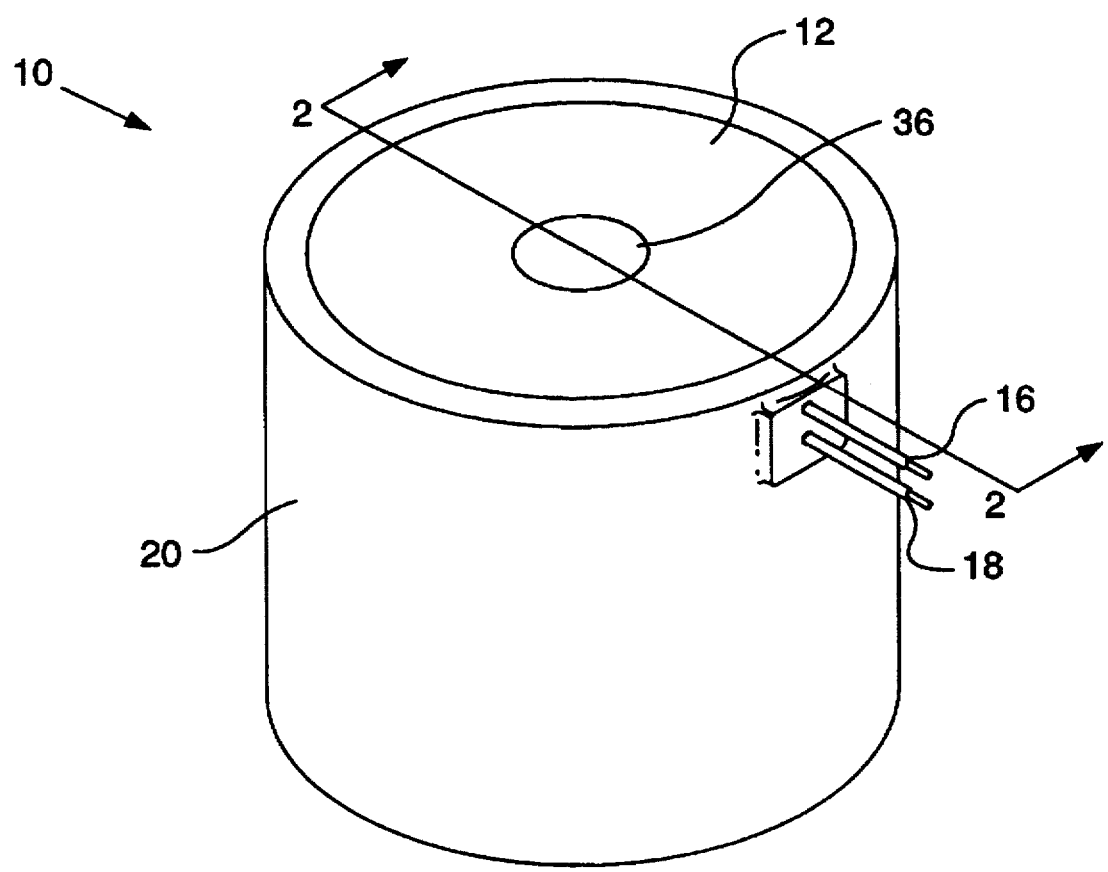
FIG. 1 is an isometric view of a coil assembly incorporating an embodiment of the subject invention.

Referring to the drawings and more particularly to FIGS. 1 and 2, a coil assembly 10 is illustrated and includes a bobbin 12, an electrical windings 14 with first and second leads 16,18 extending outwardly therefrom, and a encapsulating material 20 pressure molded around the windings 14. First and second sealing members 22,24 are disposed within the encapsulating material 20 and respectively encircles the first and second leads 16,18 extending therethrough. The first and second sealing members 22,24 are located generally adjacent the outer surface of the encapsulating material.

The bobbin 12 has a cylindrical portion 30 with flanges 32,34 disposed at each end thereof. An opening 36 is defined in the bobbin 12 and extends longitudinally therethrough.

FIG. 3 illustrates an enlarged portion of the sealing member 22 in its pressure molded position with the leads 16 extending therethrough from the windings 14. As illustrated the lead has a lead wire 16a with an insulated covering 16b. The insulated covering 16b serves to protect the lead wire 16a and to keep the lead wire 16a from contacting other elements and shorting out. A sealant is disposed between the lead wire 16a and the insulated covering 16b and serves to totally seal any voids or space between the lead wire 16a and the insulated covering 16b. A silicon elastomer may be used as the sealant.

Since both of the sealing members 22,24 are the same, only one will be described in detail. Referring to FIGS. 4 and 5, the sealing member 22 is illustrated in its pre-assembled, uncompressed condition. As noted above, since both of the sealing members are the same, only the one sealing member 22 will be described in detail. The sealing member 22 has a longitudinal length "L" with an opening 38 defined therethrough. A sealed cavity 40 is defined in the sealing member 22 by an outer portion 42, an inner portion 44 and respective end portions 46,48. As illustrated, the sealing member 22 is generally cylindrical in shape. The outer portion 42 has an outermost diameter "D". The opening 38 is defined by at least portions of the inner portion 44 and encircled by the cavity 40. The inner portion 44 extends along the longitudinal length in an undulating manner. The inner most flattened peaks 50 of the inner portion 44 coincide with the opening 38.

Referring to FIG. 6, another embodiment of the sealing member 22 is illustrated. Like elements have like element numbers. The inner portion 44 of FIG. 6 is generally straight and coincides with the opening 38. The outermost diameter "D" is at the one end of the sealing member 22 and an enlarged flange 54 is disposed at the other end. The sealed cavity 40 encircles the opening 38.

Referring to FIG. 7, another embodiment of the sealing member 22 is illustrated. Like elements have like element numbers. The outermost diameter "D" is at the one end thereof and the outer portion 42 tapers outwardly towards the other end. Inner portion 44 is generally straight and coincides with the opening 38 therethrough. The sealed cavity 40 encircles the opening 38.

Referring to FIG. 8, an embodiment of the subject invention is illustrated including a sealing member 55 that contains and seals both of the electrical leads extending outwardly from the windings 14. Like elements have like element numbers. The sealing member 55 of the subject embodiment has the opening 38 and a second opening 56 defined therethrough generally parallel with the first opening 38. The second opening 56 receives the second lead 18. The cavity 40 generally encircles both of the first and second openings 38,56. The inner portion 44 is divided into two separate portion 58,60 and each of the separate portions 58,60 respectively defines the first and second openings 38,56.

It is recognized that the sealing members 22,24 of the coil assembly 10 could be varied without departing from the essence of the subject invention. For example, the undulating inner portion illustrated in FIG. 4 could be utilized in FIGS. 6, 7, 8 and the straight inner portion 44 of FIGS. 6, 7, 8 could be utilized in FIG. 4. Additionally, the shape of the sealed cavity 40 could be of various shapes as long as there is a portion of the inner portion 44 in sealing contact with the respective leads 16,18 following the pressure molding process.

INDUSTRIAL APPLICABILITY

During the making of the coil assembly 10 according to the various embodiments, the sealing members 22,24,55 functions to effectively provide a seal between the encapsulating material and the respective electrical leads 16,18. The leads 16,18 are passed through the opening 38 of the respective sealing members 22,24 and the bobbin 12 with the windings 14 wrapped therearound is placed in a pressure molding machine (not shown). The encapsulating material 20 is forced to flow around the windings 14 filling the chamber within the pressure molding device and encircling the first and second sealing members 16,18. The pressure of the encapsulating material 20 acts on the outermost diameter "D" of the respective sealing members 16,18. As illustrated in FIG. 3, the forces exerted on the outermost diameter "D" forces the outer portion 42 inwardly. The inward movement of the outer portion 42 decreases the volume of the sealed cavity 40 thus increasing the pressure of the air/gas within the sealed cavity 40. The increased pressure within the sealed cavity 40 is exerted on the inner portion 44 urging it inward into forced contact with the respective leads 16,18. The forced contact of the inner portion 44 with the respective leads 16,18 is effective to keep the encapsulating material 20 from passing therebetween and likewise keeps any corrosive elements or other damaging elements from migrating inward towards the windings 14. The forces acting on the leads 16,18 through the respective sealing members 22,24,55 are maintained after the forces induced by the molding process is removed.

If the leads 16,18 are made of the lead wire 16a with the insulating cover 16b, the sealant used therebetween serves to ensure that damaging elements from the surrounding environment are not allow to pass therethrough. The forces of the sealing member acting on the insulating cover prohibits the passage of any damaging elements from passing therethrough. Consequently, an effective seal is provided between the encapsulating material 20 and the respective leads 16,18.

Each of the embodiments of FIGS. 4, 6, 7 function in the same manner. The enlarged flange 54 of FIG. 6 and the tapered outermost diameter of FIG. 7 function to prohibit the respective sealing members 16,18 from moving outward during the molding process or during subsequent use.

The only difference between the functioning of FIG. 8 and the functioning of FIGS. 4, 6, 7 is that both leads 16,18 are disposed within one sealing member 55. As the pressure from the molding process acts on the outer portion 42, the increased pressure in the sealed cavity 40 is exerted against the individual inner portions 58,60 to urge them into forced contact with the respective leads 16,18.

Since the coil assembly 10 may operate at elevated temperatures on the order of 200 to 225 degrees "C" and the pressure molding temperatures may be generally in the range of 250 to 300 degrees "C", it is necessary to use an elastomeric material that can withstand this level of temperatures. It is believed that a florosilicon elastomeric material or other similar materials would provide the needed characteristics. If the coil assembly 10 is normally operated at lower temperatures, various other known materials could be used without departing from the essence of the invention.

The pressure molding could be done with different processes. Injection molding is preferred, however, it is recognized that a transfer molding process could be used.

From the foregoing, it should be recognized that the subject coil assembly 10 having the sealing members 22,24, 55 are effective to provide positive sealing of the windings 14 from damaging exterior environments. The sealed cavity 40 provides the path to transfer forces from the pressure molding process inward to provide a forced contact of the sealing member against the respective leads 16,18 and to maintain these forces via the trapped air/gasses within the sealed cavity 40 throughout the coil assembly's service life. Any air trapped within the coil assembly 10 during the molding process is not allowed to expand and travel outwards during use and suck or wick back when the coil assembly cools.

Other aspects, objects and advantages of this invention can be obtained from a study of the drawings, the disclosure and the appended claims.

I claim:

1. A coil assembly, comprising:

a bobbin having a cylindrical portion with flanges disposed at opposite ends thereof and an opening defined therethrough;

an electrical conducting winding disposed around the cylindrical portion of the bobbin with an electrical lead extending outwardly therefrom;

a sealing member having a sealed cavity defined therein and being disposed around the electrical lead; and an encapsulating material pressure molded around the windings and encircling the electrical lead extending therefrom.

2. The coil assembly of claim 1 wherein the sealing member has a longitudinal length and an opening is defined therethrough along its longitudinal length and the inner surface of the opening is in intimate forced contact with the electrical lead.

3. The coil assembly of claim 2 wherein the sealed cavity generally encircles the opening of the sealing member along its longitudinal length.

4. The coil assembly of claim 3 wherein the opening has an undulating surface and the undulating surface is in intimate contact around the electrical lead at interrupted locations along its longitudinal length.

5. The coil assembly of claim 4 wherein the sealing member has an outermost diameter.

6. The coil assembly of claim 5 wherein the coil assembly has a second lead extending from the winding and includes a second sealing member having an opening defined therein with a sealed cavity generally encircling the opening therealong.

7. The coil assembly of claim 6 wherein the sealing members are made of an elastomeric material and the one end of each of the sealing members is disposed generally adjacent the outermost side of the encapsulating material.

8. The coil assembly of claim 5 wherein the outermost diameter is smaller at one end and the sealing member tapers from the one end to the other end.

9. The coil assembly of claim 5 wherein the other end of the hollow sealing member has an enlarged flange.

10. The coil assembly of claim 3 wherein the coil assembly has a second lead extending from the winding and the sealing member has a second opening defined therein with the sealed cavity defined therein generally encircling both of the first and second openings and the second lead extends through the second opening.

11. The coil assembly of claim 3 wherein the lead has an insulated covering and a sealant is disposed between the insulated covering and the lead.

* * * * *